(12) United States Patent
Miyazaki et al.

(10) Patent No.: US 8,714,331 B2
(45) Date of Patent: May 6, 2014

(54) STARTING CLUTCH

(75) Inventors: Tomoyuki Miyazaki, Fukuroi (JP);
Shun Kitahara, Fukuroi (JP); Manabu Sawayanagi, Fukuroi (JP); Masaki Sakai, Fukuroi (JP); Yosuke Ikeda, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 13/611,478

(22) Filed: Sep. 12, 2012

(65) Prior Publication Data

US 2013/0001034 A1    Jan. 3, 2013

Related U.S. Application Data

(62) Division of application No. 11/945,305, filed on Nov. 27, 2007.

(30) Foreign Application Priority Data

Dec. 15, 2006   (JP) .................................. 2006-338303

(51) Int. Cl.
*F16D 25/0638*   (2006.01)
*F16D 13/72*     (2006.01)

(52) U.S. Cl.
USPC .................. 192/85.46; 192/85.61; 192/70.12; 192/113.36; 192/55.61

(58) Field of Classification Search
USPC ............................................ 192/85.46, 85.61
See application file for complete search history.

(56) References Cited

U.S. PATENT DOCUMENTS

| | | | |
|---|---|---|---|
| 3,353,641 A | 11/1967 | Chana | |
| 4,629,050 A | 12/1986 | Valier | |
| 5,176,236 A | 1/1993 | Ghidorzi et al. | |
| 5,454,457 A | 10/1995 | Sakai et al. | |
| 5,794,751 A | 8/1998 | Kerendian | |
| 5,813,508 A | 9/1998 | Shoji et al. | |
| 6,347,695 B1 * | 2/2002 | Kuhn et al. | 192/70.12 |
| 6,464,059 B1 * | 10/2002 | Kundermann et al. | 192/48.618 |
| 6,929,105 B2 | 8/2005 | Sasse | |
| 7,063,197 B2 * | 6/2006 | Merkel et al. | 192/85.24 |
| 7,293,637 B2 | 11/2007 | Janson et al. | |

(Continued)

FOREIGN PATENT DOCUMENTS

JP   03-065028 U   6/1991
JP   2002-357232   12/2002

(Continued)

OTHER PUBLICATIONS

U.S. Appl. No. 11/945,250, filed Nov. 26, 2007—Miyazaki et al.

(Continued)

*Primary Examiner* — David D Le
*Assistant Examiner* — Ryan Dodd
(74) *Attorney, Agent, or Firm* — Miles & Stockbridge P.C.

(57) ABSTRACT

The present invention provides a starting clutch disposed between a transmission and an engine and having a wet type multi-plate clutch for transmitting a power, in which the wet type multi-plate clutch includes a plurality of friction plates housed for an axial sliding movement, a clutch drum for housing the friction plates, and a piston for urging a radial central region or therearound of the friction plate to engage the friction plates, and oil which has lubricated the wet type multi-plate clutch is temporarily trapped within the clutch drum and then is discharged.

10 Claims, 4 Drawing Sheets

(56) References Cited

U.S. PATENT DOCUMENTS

| | | |
|---|---|---|
| 7,431,138 B2 | 10/2008 | Heinrich et al. |
| 7,966,901 B2 * | 6/2011 | Metzinger et al. ............... 74/331 |
| 2003/0015392 A1 | 1/2003 | Shoji et al. |
| 2005/0016813 A1 * | 1/2005 | Watanabe et al. ........... 192/70.12 |
| 2005/0087420 A1 * | 4/2005 | Schafer et al. ............. 192/55.61 |
| 2005/0284722 A1 | 12/2005 | Heinrich et al. |
| 2006/0081435 A1 * | 4/2006 | Heinrich et al. ........... 192/70.11 |
| 2006/0163023 A1 * | 7/2006 | Sudau et al. ................ 192/113.3 |
| 2008/0121488 A1 * | 5/2008 | Miyazaki et al. .......... 192/70.12 |
| 2008/0142331 A1 * | 6/2008 | Miyazaki et al. .......... 192/70.12 |
| 2008/0217133 A1 | 9/2008 | Ikeda et al. |

FOREIGN PATENT DOCUMENTS

| | | |
|---|---|---|
| JP | 2003-063261 A | 3/2003 |
| JP | 2006-105397 A | 4/2006 |
| WO | WO 03/023243 A2 | 3/2003 |

OTHER PUBLICATIONS

Japanese Patent Application No. 2006-338303—Office Action dated Feb. 13, 2012.

* cited by examiner

STARTING CLUTCH

CROSS-REFERENCE TO RELATED APPLICATIONS

This application is a division of application Ser. No. 11/945,305 filed Nov. 27, 2007. Also, the disclosure of Japanese Patent Application No. 2006-338303 filed Dec. 15, 2006 including the specification, drawings and abstract is incorporated herein by reference in its entirety.

BACKGROUND OF THE INVENTION

1. Field of the Invention

The present invention relates to a starting clutch which can be used in place of a torque converter for a motor vehicle and the like.

2. Description of the Related Art

In the past, in automatic transmissions, the starting of a vehicle has been achieved through torque transmission of a torque converter. The torque converter has been mounted on many vehicles since the torque converter serves to amplify the torque and also provides smooth torque transmission.

On the other hand, the torque converter has disadvantages that a slip amount is increased during the torque transmission and that efficiency is relatively bad.

Thus, in recent years, it has been proposed that a starting clutch is used in place of the torque converter and it has also been implemented that, in a low speed range, the torque is amplified by increasing a gear ratio and by increasing the number of transmission stages.

In general, the starting clutch includes a wet type multi-plate clutch housed in a clutch drum. In the multi-plate clutch, friction plates as friction engaging elements at an output side and separator plates as friction engaging elements at an input side are alternately arranged along an axial direction. With this arrangement, when the friction plates and the separator plates are engaged with each other by a piston, a power can be transmitted.

In the starting clutch, since great heat is generated, it is necessary to supply a large amount of lubricating oil for the cooling. Thus, although an oil pump must has a great pump capacity, a pump capacity of an oil pump provided in the conventional transmission is insufficient, and, therefore, there arises a problem that such an insufficient oil pump cannot be mounted to the starting clutch as it is. Further, since the conventional oil pumps perform the cooling operation with a small amount of oil, heat may be accumulated in the clutch portion and then the clutch may be burned.

Japanese Patent Application Laid-open No. 2002-357232 discloses a starting clutch in which a large amount of lubricating oil is used to cool the clutch and a plurality of holes is provided to discharge the lubricating oil along a radial direction of a clutch drum. In this case, however, since the lubricating oil is discharged faster from the clutch portion, heat exchange between the clutch portion and the oil cannot be achieved sufficiently, with the result that the cooling efficiency of the clutch may be worsened and the heat is apt to be accumulated in the clutch portion. Further, as described in U.S. Pat. No. 6,929,105, if the oil is filled, although the heat of the clutch portion is transmitted to the oil, the oil is retained in the clutch portion for a longer term, and, thus, similar to the above-mentioned Japanese Patent Application Laid-open No. 2002-357232, the heat may not be removed from the clutch portion smoothly.

SUMMARY OF THE INVENTION

Accordingly, an object of the present invention is to provide a starting clutch in which heat of the clutch can be cooled efficiently with a small amount of lubricating oil and a sufficient cooling operation can be achieved even when an oil pump provided in an existing transmission is used.

To achieve the above object, the present invention provides a starting clutch disposed between a transmission and an engine and having a wet type multi-plate clutch for transmitting a power, wherein the wet type multi-plate clutch comprises a plurality of friction plates housed for an axial sliding movement, a clutch drum for housing the friction plates therein, and a piston for urging a substantially radial central portion of the friction plate to engage the friction plates with each other, and further wherein lubricating oil which has lubricated the wet type multi-plate clutch is trapped in the clutch drum and then is discharged.

According to the starting clutch of the present invention, the following effects can be obtained.

Since the piston for urging the substantially radial central portion of the friction plate to engage the friction plates with each other is provided, face pressure distribution on a friction surface of each friction plate becomes uniform, thereby providing a starting clutch having a good heat resisting ability and a stable operation.

Since the cooling oil supplied to the friction plates efficiently is temporarily trapped in an inner diameter side of a hub member and in the clutch thereby to absorb the heat from the clutch portion and then is quickly discharged from the clutch portion toward the transmission by a centrifugal action of the clutch portion, both reduction in the capacity of the oil pump and the heat resisting ability of the starting clutch can be compatible, thereby enhancing reduction in fuel consumption and enhancing reliability.

Further, the starting clutch can be cooled with a small amount of oil and the starting clutch can be attached to the existing transmission.

Further features of the present invention will become apparent from the following description of an exemplary embodiment (with reference to the attached drawing).

DESCRIPTION OF THE EMBODIMENTS

Now, embodiments of the present invention will be fully described with reference to the accompanying drawings. Incidentally, it should be noted that the illustrated embodiments are merely exemplary and various changes can be made within the scope of the present invention.

First Embodiment

Figure 1:
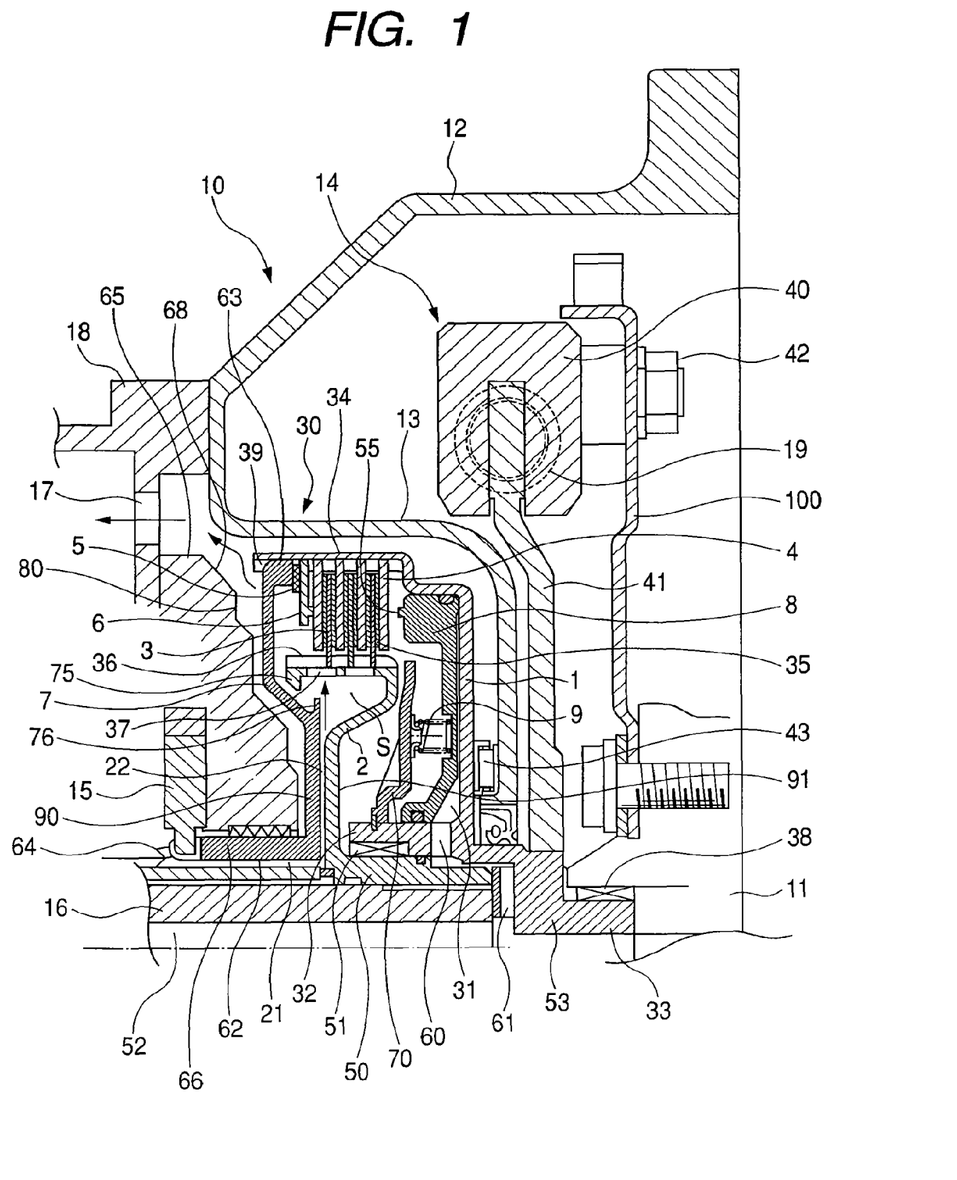
FIG. 1 is an axial sectional view showing a starting clutch according to a first embodiment of the present invention.

FIG. 1 is an axial sectional view showing a starting clutch according to a first embodiment of the present invention. The starting clutch 10 includes a clutch drum 1 and a wet type multi-plate clutch 30 housed within the clutch drum. The wet type multi-plate clutch 30 comprises substantially annular friction plates (internally-toothed plates) 3 as friction engaging elements at an output side and substantially annular separator plates (externally-toothed plates) 4 as friction engaging elements at an input side, which plates are arranged alternately along an axial direction within the clutch drum 1. Within one axial end (open end) of the clutch drum 1, a substantially annular backing plate 6 is fixedly supported by a substantially annular stop ring 5 in the axial direction, thereby holding the separator plates 4.

The annular clutch drum 1 is provided at its inner periphery with a central cylindrical portion 32 and is also provided at its outer periphery with an outer diameter portion i.e. drum portion 34 opposed to the cylindrical portion 32 in a radial direction. The drum portion 34 is provided at its inner periphery with a spline portion 39 with which the separator plates 4 are engaged for an axial sliding movement. At an axial opposite end of the cylindrical portion 32, there is provided a protruded portion 33 which is fitted into a recessed portion 38 of a crankshaft 11. Further, the cylindrical portion 32 is supported by an input shaft 16 connected to a transmission (not shown) through a hub member 2 and a bearing 51, which will be described later.

In the illustrated embodiment, although the wet type multi-plate clutch 30 is constituted by three friction plates 3 and four separator plates 4, it should be noted that the number of such friction engaging elements at the input and output sides can be changed voluntarily in accordance with the required torque. Further, a substantially annular friction material 35 or a plurality of friction material segments is fixed to on both axial surfaces of the friction plate 3 by an adhesive. Further, a friction material 35 may be fixed to the separator plate (externally-toothed plate) 4 or friction materials 35 may be fixed to one surface of the friction plate (internally-toothed plate) 3 and one surface of the separator plate 4 alternately.

In FIG. 1, at the open end portion of the clutch drum 1 within the clutch drum 1, a piston 8 is fitted on the outer periphery of the cylindrical portion 32 for an axial sliding movement, and a hydraulic chamber 31 for applying oil pressure to the piston 8 is defined between the piston 8 and the clutch drum 1. At opposite side of the piston 8 from the hydraulic chamber 31, a plate 70 is secured to the cylindrical portion 32. An axial one end of a spring 9 is secured to the plate 70. The other axial end of the spring 9 abuts against the piston 8 to apply a predetermined urging force to the piston 8, thereby always biasing the piston 8 toward the hydraulic chamber 31 i.e. toward a disengaging or releasing direction of the clutch. Here, although the spring 9 is shown as a coil spring having predetermined elasticity, other type of spring may be used. Projections 55 protruding toward the axial direction are provided on a surface of the piston 8 opposed to the separator plate 4 and on plate surfaces far from the piston 8, so that, when the projection 55 urge the centers or therearound of load acting points of the separator plates 4, friction surfaces of all of the plates are contacted with each other with uniform face pressure throughout the entire engaging areas, whereby the wet type multi-plate clutch 30 is engaged or tightened. Further, due to the uniform face pressure, offset of the heated regions can be prevented, thereby enhancing the heat resisting ability of the clutch portion.

The hub member 2 fitted on the input shaft 16 of the transmission to be rotated integrally with the input shaft 16 is provided at its outer periphery with a spline portion 36. The friction plates 3 are fitted in the spline portion 36 having axial through-holes 37 for an axial sliding movement. Accordingly, a power inputted from the crankshaft 11 of the engine (not shown) is transmitted to the transmission (not shown) through a drive plate 100 through a damper device 14 (described later), clutch drum 1, wet type multi-plate clutch 30, hub member 2 and input shaft 16.

The clutch drum 1 of the wet type multi-plate clutch 30 is covered by a cover portion 13 which is a part of a housing 12. Further, a damper device 14 as a shock absorbing mechanism for absorbing shock generated during the clutch engagement is provided within the housing 12. The damper device 14 is constituted by a retainer plate 40 for holding a spring 19, and a pawl member 41 attached to an outer periphery of a cylindrical portion 53 of the clutch drum 1 and fitted on the spring 19. The retainer plate 40 is secured to the drive plate 100 by nuts 42. Further, thrust needle bearings 43 are disposed between the clutch drum 1 and the housing 12.

The input shaft 16 of the transmission to which the power from the engine is transmitted is provided with an oil supplying path 52 extending in the axial direction. Hydraulic oil supplied from a supply source (not shown) is supplied to the hydraulic chamber 31 which is maintained to an oil-tight condition by a plurality of seal members, through a gap between the input shaft 16 and the cylindrical portion 53 and then through a radial through hole 60 formed in the cylindrical portion 32 of the clutch drum 1.

At an axial one end, the input shaft 16 is provided at its outer periphery with a spline portion into which a cylindrical portion 50 of the hub member 2 is spline-fitted. That is to say, the input shaft 16 can be rotated integrally with the hub member 2. A thrust washer 61 is disposed between the hub member 2 and the cylindrical portion 53 of the clutch drum 1 and the end of the input shaft 16. The thrust washer 61 may be a needle bearing.

As mentioned above, the hub member 2 is fitted on the input shaft of the transmission for the axial sliding movement and the cylindrical portion 32 of the clutch drum 1 is fitted into the cylindrical portion of the hub member 2 through a bearing 51 for a relative rotational movement. A protruded portion 33 of the clutch drum 1 extending toward the engine is supported by the crankshaft 11 and the cylindrical portion 32 of the clutch drum 1 extending toward the transmission is supported by an outer peripheral surface of the cylindrical portion 50 of the hub member 2.

A cover member 7 is provided at the open end portion of the clutch drum 1. An outer diameter edge portion 63 of the cover member 7 is fitted into the spline portion 39 of the clutch drum 1. Thus, the cover member 7 is rotated together with the clutch drum 1. An inner diameter side of the cover member 7 constitutes a cylindrical portion 62 so that an axial lubricating oil passage 21 is defined between the cylindrical portion and the input shaft 16. An axial end 64 of the cylindrical portion 62 is connected to an oil pump 15 so that the oil pump 15 is operated by a rotation of the cover member 7. The oil from the oil pump 15 is temporarily supplied to a hydraulic control device (not shown) of the transmission and then is supplied to the starting clutch 10 and a brake portion (not shown) and a clutch portion (not shown) of the transmission as operating oil and is also supplied to various parts of the starting clutch 10 and the transmission to lubricate these parts.

The cover member 7 as means for trapping the oil supplied for the lubrication in the interior of the hub member 2 is rotatably supported by a side wall of the transmission through a needle bearing 66. As can be seen from FIG. 1, by providing the cover member 7, the wet type multi-plate clutch 30 is situated within a substantially enclosed space. A transmission case 18 disposed in adjacent to the starting clutch 10 is provided at its side wall with an oil returning port 17 extending in the axial direction.

An intermediate portion 91 extends from an end of the cylindrical portion 50 of the hub member 2 at the transmission side in the radial direction and then is bent toward the engine at an intermediate region and then extends toward the transmission in the axial direction thereby to form a spline portion 36. Further, an intermediate portion 90 extends from an end of the cylindrical portion 62 of the cover member 7 at the engine side in the radial direction and then is bent toward the transmission at an intermediate region and then further extends radially outwardly to form an outer diameter edge portion 63. The intermediate portions 90 and 91 are adjacent to and opposed to each other to define a narrow passage 22 therebetween.

As can be seen from FIG. 1, the hub member 2, spline portion 36 and cover member 7 define a space S enclosed at the inner diameter side of the hub member 2. Accordingly, the oil directed from the passage 22 toward the outer diameter side can be supplied efficiently to the clutch portion by the presence of the space S. Further, in the clutch portion disposed at the downstream side of the space S, the oil is apt to be trapped by not providing lubricating oil discharging hole(s) at the outer diameter side of the clutch drum or by reducing the number of the discharging holes or reducing sizes of the discharging holes.

A free end of the hub member 2 at the opposite side (inner diameter side) from the spline portion 36 is provided with a projection 75 protruding toward the inner diameter direction. The projection 75 acts as means for staying or trapping the oil (to be supplied for the lubrication) within the inner diameter side of the hub member 2 and is provided as a continuous or intermittent annulus. Further, a surface of the cover member 7 opposed to the hub member is provided with an annular protruded portion 76 protruding toward the spline portion 36 of the hub member 2. The projection 75 and the protruded portion 76 are offset offset from each other in the axial direction to define so-called labyrinth for the lubricating oil from the passage 22 (described later) so that the lubricating oil is apt to be trapped between the hub member 2 and the cover member 7.

An oil returning port 17 is provided to extend through a side wall of the transmission case 18 disposed in adjacent to the starting clutch 10. The lubricating oil which has lubricated the wet type multi-plate clutch 30 is returned to the interior of the transmission through the oil returning port 17.

Now, the oil path for the lubricating oil lubricating the wet type multi-plate clutch 30 and the oil path for supplying the oil to the hydraulic chamber 31 will be explained. By driving the oil pump 15, the lubricating oil for lubricating the wet type multi-plate clutch 30 flows from the transmission to the wet type multi-plate clutch 30 through the lubricating oil passage 21, the passage 22 defined between the hub member 2 and the cover member 7 and the through hole 37 of the hub member 2, thereby lubricating the wet type multi-plate clutch. Since the drum portion 34 of the clutch drum 1 has no radial through hole, the lubricating oil which has lubricated the wet type multi-plate clutch 30 cannot be moved outwardly in the radial direction and thus is temporarily accumulated within the interior of the clutch portion and then is directed toward the axial direction i.e. toward the cover member 7 through the spline portion 39 of the clutch drum. Thus, if necessary, the cover member 7 may include axial through hole(s) for smoothing the flow of the lubricating oil.

After passed through the cover member 7, the lubricating oil further flows in the axial direction and is returned to the transmission through the oil returning port 17 formed in the side wall of the transmission case 18. The paths through which the lubricating oil flows are shown by the arrows in FIG. 1. As can be understood from the above explanation, the lubricating oil is supplied from the axial direction and is discharged in the axial direction.

Next, a hydraulic circuit for controlling the piston 8 will be explained. The hydraulic oil is supplied from the oil supply source (not shown) to an oil supply path 52 formed in the input shaft 16. The oil passed through the oil supply path 52 flows from the gap between the input shaft 16 and the end face of the cylindrical portion 53 and passes through a radial through hole 60 formed in the cylindrical portion 32 of the clutch drum 1 and is supplied to the hydraulic chamber 31. By oil pressure supplied from a hydraulic circuit (not shown), the piston 8 is shifted to the left (FIG. 1) to tighten the wet type multi-plate clutch 30.

The above-mentioned oil path for the lubricating oil and the hydraulic circuit for controlling the piston are provided independently from each other. Thus, the replacement between the starting clutch of the present invention and the existing torque converter can easily be made.

Next, a procedure for attaching the starting clutch of the present invention between the engine and the transmission is as follows. First of all, the starting clutch 10 and the damper device 14 are assembled as a unit which is in turn inserted into the spline portion of the input shaft 16 of the transmission. Then, the protruded portion 33 of the clutch drum 1 is inserted into the crankshaft 11 of the engine. Thereafter, by fixing the damper device 14 and the drive plate, in the starting clutch 10, the transmission and the crankshaft 11 of the engine are aligned with each other, and the axial attachment error is absorbed, thereby providing high accurate assembling. Further, since the clutch drum 1 at the drive side is firmly supported by the crankshaft 11 and the input shaft 16 of the transmission, the rotational accuracy is enhanced, and an anti-judder property and wear resisting ability of the rotating parts are also enhanced, thereby providing good starting performance.

As mentioned above, since it is designed so that the hub member 2 is spline-fitted on the input shaft 16, the clutch drum 1 is fitted to the hub member 2 and the clutch drum 1 is supported by the crankshaft 11, alignment between the parts of the clutch portion, transmission and engine can be made effectively. Further, since the cylindrical portion 50 of the hub member 2 is held to be pinched between the input shaft 16 and the cylindrical portion 32 of the clutch drum 1, the rotation of the hub member 2 is stabilized.

Second Embodiment

Figure 2:
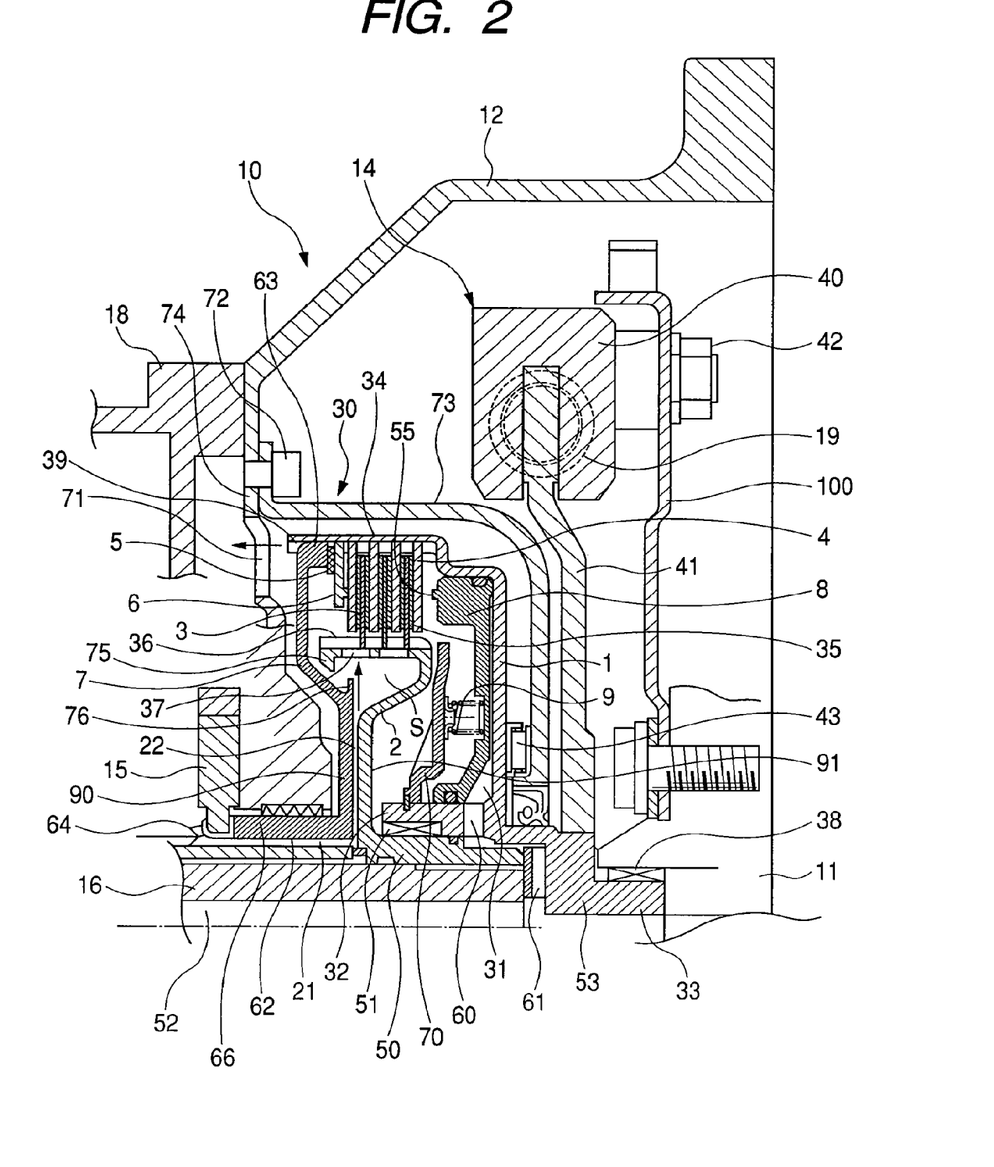
FIG. 2 is an axial sectional view showing a starting clutch according to a second embodiment of the present invention.

FIG. 2 is an axial sectional view showing a starting clutch according to a second embodiment of the present invention. Since a fundamental arrangement of the second embodiment is the same as that of the first embodiment, the detailed explanation thereof will be omitted.

The second embodiment differs from the first embodiment regarding a construction of a clutch cover and a lubricating oil discharging path. A clutch cover 73 covering the clutch portion 30 is provided independently from the housing 12. Although the connection to the clutch drum 1 is similar to that in the first embodiment, the clutch cover 73 is secured to a side wall of the housing 12 at the transmission side by bolts 72.

The side wall 74 is provided with a through hole 71 through which the lubricating oil which has lubricated the clutch portion 30 is discharged toward the transmission. The lubricating oil from the clutch portion 30 passes through the through hole 71 and flows toward the transmission. As can be seen from FIG. 2, the through hole 71 is substantially opposed, in the axial direction, to a friction engaging portion of the clutch portion including the friction plates 3 and the separator plates 4, so that the lubricating oil which has lubricated the friction engaging portion can be directed toward the through hole 71 efficiently.

Figure 5:
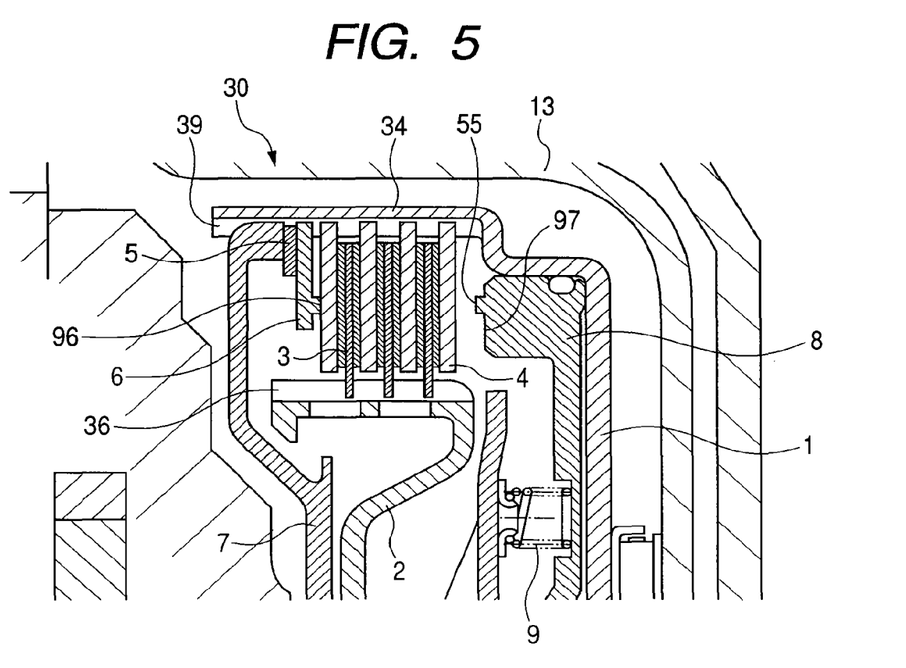
FIG. 5 is an enlarged sectional view showing a clutch portion of FIG. 1 in detail.

Now, urging of the friction plates will be explained in more detail with reference to FIG. 5. FIG. 5 is an enlarged sectional view showing details of the clutch portion of FIG. 1. An urging surface 97 of the piston 8 is provided with an axially protruding projection 55 for urging a radially central region or therearound of the friction plate. Further, the backing plate 6 which abuts against the friction plate at the opposite side from the piston 8 along the axial direction has an axially extending protruded portion 96 for urging a radially central region or therearound of the friction plate. That is to say, in FIG. 5, the projection 55 of the piston 8 can abut against the rightmost separator plate 4 and the protruded portion 96 of the backing plate 6 abuts against the leftmost separator plate 4.

As can be seen from FIG. 5, it is preferable that the projection 55 of the piston 8 and the protruded portion 96 of the backing plate 6 are arranged on the same single line. Further, a contact area between the projection 55 and the separator plate 4 and a contact area between the protruded portion 96 and the separator plate 4 each corresponds to a substantially radial central region of the friction surface of the friction plate i.e. separator plate 4.

Each of the projection 55 and the protruded portion 96 can be formed as a continuous annulus but may be formed as ring segments with a predetermined gap therebetween. With this arrangement, the friction plates can be engaged with each other positively, thereby providing a starting clutch having a good heat resisting property and a stable operation.

Third Embodiment

Figure 3:
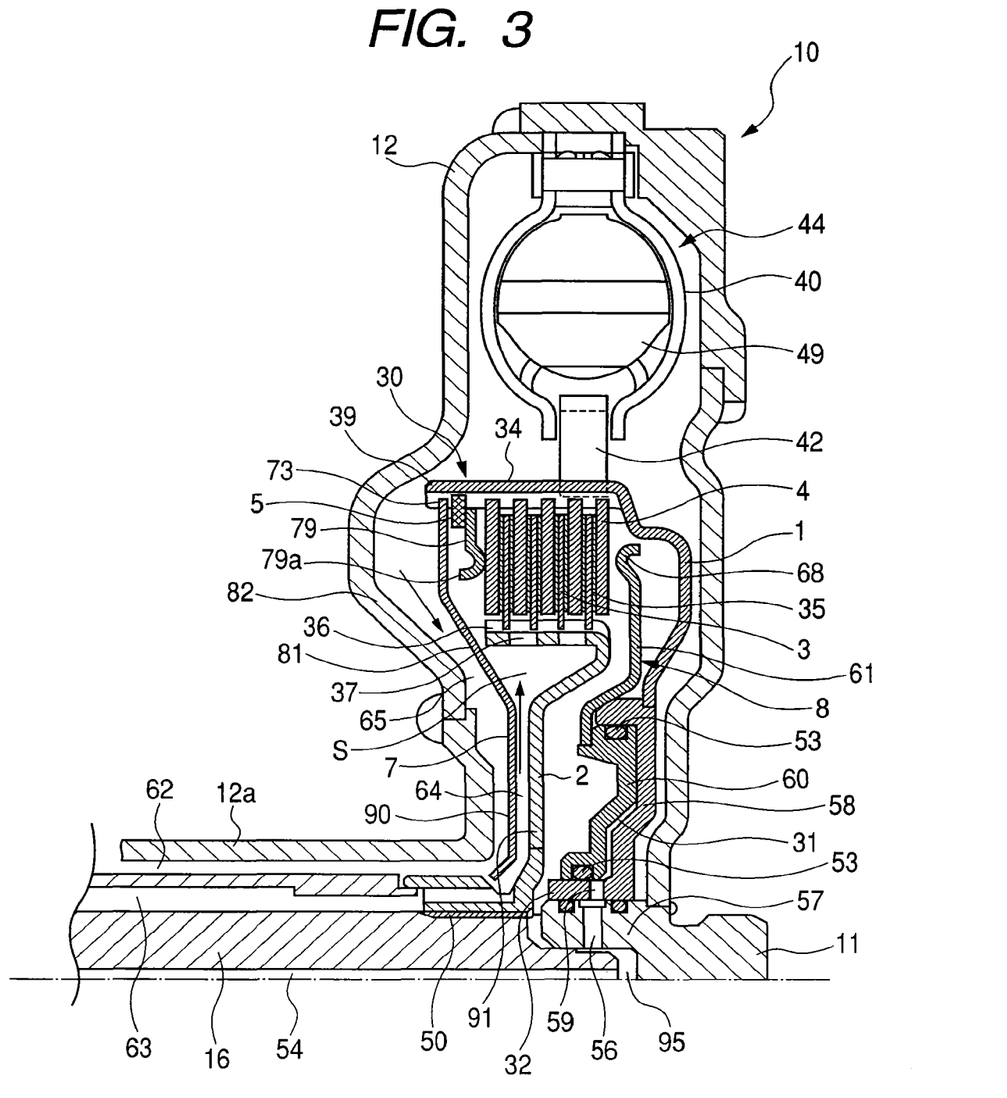
FIG. 3 is an axial sectional view showing a starting clutch according to a third embodiment of the present invention.

FIG. 3 is an axial sectional view of a starting clutch according to a third embodiment of the present invention. The starting clutch 10 includes a clutch drum 1 and a wet type multi-plate clutch 30 housed in the clutch drum. The wet type multi-plate clutch 30 comprises substantially annular friction plates (internally-toothed plates) 3 as friction engaging elements at an output side and substantially annular separator plates (externally-toothed plates) 4 as friction engaging elements at an input side, which plates are arranged alternately along an axial direction within the clutch drum 1. Within one axial end (open end) of the clutch drum 1, a substantially annular backing plate 79 is fixedly supported by a substantially annular stop ring 5 in the axial direction, thereby holding the separator plates 4. The backing plate 79 is provided at it tip end with a curved portion 79a protruding toward the clutch portion.

The annular clutch drum 1 is provided at its inner periphery with a central cylindrical portion 32 and is also provided at its outer periphery with an outer diameter portion i.e. drum portion 34 opposed to the cylindrical portion 32 in a radial direction. The drum portion 34 has no radial through holes. The drum portion 34 is provided at its inner periphery with a spline portion 39 with which the separator plates 4 are engaged for an axial sliding movement. An axial opposite end of the cylindrical portion 32 is fitted onto an outer periphery of a cylindrical portion 57 of an inner diameter side boss 11 of the housing 12.

In the illustrated embodiment, although the wet type multi-plate clutch 30 is constituted by three friction plates 3 and four separator plates 4, it should be noted that the number of such friction engaging elements at the input and output sides can be changed voluntarily in accordance with the required torque.

Further, a substantially annular friction material 35 or a plurality of friction material segments is fixed to on both axial surfaces of the friction plate 3 by an adhesive. Further, a friction material 35 may be fixed to the separator plate (externally-toothed plate) 4 or friction materials 35 may be fixed to one surface of the friction plate (internally-toothed plate) 3 and one surface of the separator plate 4 alternately.

In FIG. 3, a piston 8 is provided at the closed end portion of the clutch drum 1 within the clutch drum 1. The piston 8 has an urging portion 61 for abutting against the separator plate 4 to apply an urging force to the separator plate, and a base portion 60 connected to the urging portion 61. The urging portion 61 is provided at its tip end with a curved portion 68 protruding toward an abutting direction so as to abut against the separator plate. The base portion 60 is fitted onto the cylindrical portion 32 of the clutch drum 1 for an axial sliding movement.

In the illustrated embodiment, it is preferable that the curved portions 68 and 79a are arranged on the same single line. Further, a contact area between the curved portion 68 and the separator plate 4 and a contact area between the curved portion 79a and the separator plate 4 each corresponds to a substantially radial central region of the friction surface of the friction plate i.e. separator plate 4.

Each of the curved portions 68 and 79a can be formed as a continuous annulus but may be formed as ring segments with a predetermined gap therebetween. With this arrangement, the friction plates can be engaged with each other positively, thereby providing a starting clutch having a good heat resisting property and a stable operation.

A hydraulic chamber 31 which is maintained in an oil-tight condition by two O-ring seals 53 is defined between the base portion 60 and the inner surface of the clutch drum 1. By supplying hydraulic oil from an oil path (described later) to the hydraulic chamber 31, a shifting movement of the piston 8 can be controlled to obtain the predetermined urging force. A spring may be provided to apply a predetermined urging force to the piston 8, thereby always biasing the piston 8 toward the hydraulic chamber 31 i.e. toward a disengaging or releasing direction of the clutch.

When the predetermined hydraulic oil is supplied to the hydraulic chamber 31, the piston 8 is shifted to the left (FIG. 3), thereby tightening the wet type multi-plate clutch 30 between the piston and the backing plate 79. In this case, each of apexes (protruding toward the clutch portion) of the curved portion 68 of the piston 8 and the curved portion 79a of the backing plate 79 urges a central region or therearound of the respective separator plate 4. Thus, friction surfaces of all of the plates are contacted with each other with uniform face pressure throughout the entire engaging areas, whereby the wet type multi-plate clutch 30 is engaged or tightened. Further, due to the uniform face pressure, concentration of the heated regions can be prevented, thereby enhancing the heat resisting ability of the clutch portion.

The hub member 2 fitted on the input shaft 16 of the transmission to be rotated integrally with the input shaft 16 is provided at its outer periphery with a spline portion 36. The friction plates 3 are fitted in the spline portion 36 having axial through-holes 37 for an axial sliding movement. Accordingly, a power inputted from the crankshaft (not shown) of the engine (not shown) is transmitted to the transmission (not shown) through the housing 12 through a damper device (described later), clutch drum 1, wet type multi-plate clutch 30, hub member 2 and input shaft 16.

The clutch drum 1 of the wet type multi-plate clutch 30 includes a damper device 44 as a shock absorbing mechanism for absorbing shock generated during the clutch engagement.

The damper device 44 is constituted by a retainer plate 40 for holding a spring 49, and a pawl member 42 attached to an outer periphery of the drum portion 34 of the clutch drum 1 and fitted on the spring 49.

The input shaft 16 of the transmission to which the power from the engine is transmitted is provided with an oil supplying path 54 extending in the axial direction. Hydraulic oil supplied from a supply source (not shown) is supplied to the hydraulic chamber 31 through the oil supplying path 54, a gap 95 between the input shaft 16 and the boss 11 and an axial through hole 56 of the cylindrical portion 57 of the boss 11 of the housing 12 and then through an axial through hole 59 formed in the cylindrical portion 32 of the clutch drum 1.

At an axial one end, the input shaft 16 is provided at its outer periphery with a spline portion into which a cylindrical portion 50 of the hub member 2 is spline-fitted. That is to say, the input shaft 16 can be rotated integrally with the hub member 2.

A cover member 7 is provided at the open end portion of the clutch drum 1. An outer diameter edge portion 73 of the cover member 7 is fitted into the spline portion 39 of the clutch drum 1. Thus, the cover member 7 is rotated together with the clutch drum 1. The cover member 7 defines a narrow lubricating oil passage 64 between the hub member 2 and the cover member, which lubricating oil passage 64 is communicated with an oil passage 63 provided in an outer periphery of the input shaft 16.

Further, a passage 65 is provided between the housing 12 and the cover member 7 and an oil discharging path 62 is provided between a cylindrical portion 12a formed at the inner diameter side of the housing 12 and the input shaft 16, thereby providing a passage through which the oil which has lubricated the clutch portion 30 is discharged toward the transmission. An oil from an oil pump (not shown) driven through the cylindrical portion 12a of the housing 12 is temporarily supplied to a hydraulic control device (not shown) at the transmission side and then is supplied as operating oil for the starting clutch 10 and a brake portion (not shown) and a clutch portion (not shown) at the transmission side and is also supplied to lubricate various parts of the starting clutch 10 and the transmission.

In the illustrated embodiment, an outer peripheral edge portion 73 of the cover member 7 as means for trapping the oil supplied for the lubrication within the hub member 2 is fitted in the spline portion 39 of the clutch drum 34, whereby the cover member is supported to be rotated together with the clutch drum 34. As can be seen from FIG. 3, by providing the cover member 7, the wet type multi-plate clutch 30 is disposed within a substantially enclosed space.

An intermediate portion 91 extends from an end of the cylindrical portion 50 of the hub member 2 at the transmission side in the radial direction and then is bent toward the engine at an intermediate region and then extends toward the transmission in the axial direction thereby to form a spline portion 36. Further, an intermediate portion 90 of the cover member 7 extends in the radial direction and then is bent toward the transmission at an intermediate region and then further extends radially outwardly to form an outer diameter edge portion 73. The intermediate portions 90 and 91 are adjacent to and opposed to each other in the axial direction to define a narrow passage 64 therebetween. By providing the cover member 7, the lubricating oil passage 64 for supplying the lubricating oil can be separated from the lubricating oil passage 65 for discharging the lubricating oil so that the oil can be efficiently supplied and discharged.

As can be seen from FIG. 3, the hub member 2, spline portion 36 and cover member 7 define a space S enclosed at the inner diameter side of the hub member 2. Accordingly, the oil directed from the passage lubricating oil 64 toward the outer diameter side can be supplied efficiently to the clutch portion by the presence of the space S. Further, in the clutch portion disposed at the downstream side of the space S, the oil is apt to be trapped by not providing lubricating oil discharging hole(s) at the outer diameter side of the clutch drum or by reducing the number of the discharging holes or reducing sizes of the discharging holes.

As can be seen from FIG. 3, by providing the cover member 7, the wet type multi-plate clutch 30 is disposed within a substantially enclosed space.

Figure 4:
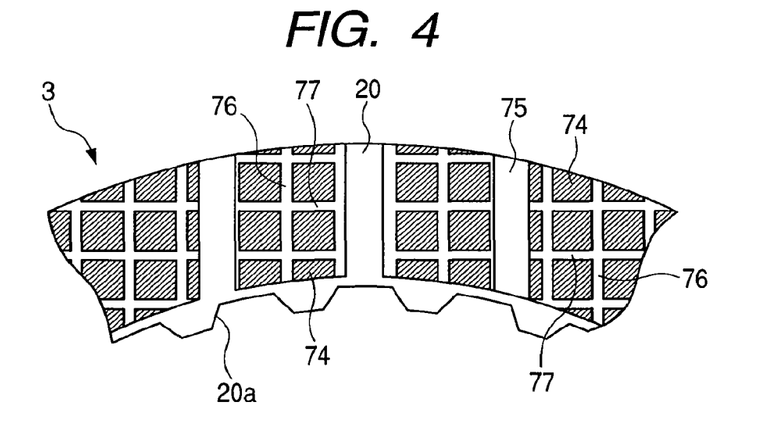
FIG. 4 is a partial front view of a friction plate used in the embodiments of the present invention.

Next, the friction plate used in the various embodiments of the present invention will be fully explained with reference to FIG. 4. The friction plate 3 is constituted by adhering a plurality of friction material segments 74 on an annular steel core plate 20 in an annular fashion by an adhesive. Splines 20a are formed in an inner periphery of the core plate 20 and the splines 20a are fitted in the spline portion 36 of the hub member 2.

A plurality of grooves 76 parallel to a diameter direction of the core plate and a plurality of grooves 77 perpendicular to the diameter direction are formed in a surface of the friction material segment 74 at substantially equidistant intervals. The grooves 76 and the grooves 77 are formed as recessed grooves by a pressing operation before or after the friction material segment 74 is secured to the core plate 20. As shown, the grooves 76 are disposed substantially perpendicular to the grooves 77.

Between the friction material segments 74, there is provided a groove 75 disposed in parallel with the diametrical direction of the core plate 20 i.e. in parallel with the grooves 76. By the presence of the groove 75, the surfaces of the core plate 20 are exposed between the friction material segments 74.

The grooves formed in the friction material segment 74 may be radial grooves. Further, in place of the segments, an annular friction material may be secured to the core plate. The friction material segments or the annular friction material may be secured to one surface or both surfaces of the core plate 20. If the friction material is secured to one surface of the core plate, a friction material may be secured to a surface of another separator plate 4 opposed to the other surface of the core plate having no friction material.

The grooves 75, 76 and 77 must serve to maintain the fluidity of the lubricating oil and to hold the lubricating oil for efficient heat exchange. To this end, a total volume ratio of the grooves 75, 76 and 77 determined by axial depths and widths of the grooves is selected to about 10% to about 50%. Preferably, the total volume ratio is about 20% to about 40%. Here, the "total volume ratio" means a ratio of total volumes of the grooves 75, 76 and 77 to a total volume of the friction material when the annular friction material is uniformly stuck to the core plate 20.

In the above-mentioned embodiments of the present invention, the spring 9 for applying the urging force to the piston 8 to tighten the wet type multi-plate clutch 30 of the starting clutch may be, for example, a leaf spring or a wave spring, in place of the coil spring. Further, the urging force i.e. spring force or the oil pressure for urging the piston may be set in consideration of various factors such as a weight of the vehicle, coefficients of friction of the friction engaging elements of the starting clutch, surface areas of the friction engaging surface and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2006-338303 filed Dec. 15, 2006, which is hereby incorporated by reference herein.

What is claimed is:

1. A starting clutch disposed between an engine and a transmission and having a wet type multi-plate clutch portion for transmitting power, said wet type multi-plate clutch portion being provided in a housing and covered with a clutch cover separate from said housing, wherein:

said wet type multi-plate clutch portion comprises:
a plurality of friction plates disposed for an axial sliding movement;
a clutch drum for housing said friction plates;
a hub member provided radially inward of the clutch drum to hold the friction plates for an axial sliding movement, said hub member having a projection projecting radially inward;
a cover member for covering an open portion of said clutch drum, said cover member being engaged with a spline portion provided on an inner periphery of said clutch drum and rotated together with said clutch drum to drive an oil pump;
a piston for pressing a radially central portion of a first friction plate at a first axial end of the plurality of friction plates in an axial direction for engagement of the plurality of friction plates; and
a contacting member for contacting a radially central portion of a second friction plate at a second axial end of the plurality of friction plates to stop sliding movement of said friction plates in said axial direction,
wherein a surface of the piston opposed to the first friction plate is provided with a first axial protrusion that presses the radially central portion of the first friction plate, and a surface of the contacting member opposed to the second friction plate is provided with a second axial protrusion that contacts the radially central portion of the second friction plate, and
wherein the starting clutch is constructed so that oil which has lubricated the wet type multiplate clutch portion is accumulated in the clutch drum and then discharged, an inner surface of the cover member being provided with a radially outward projection, that is opposite to and axially offset from the projection of the hub member.

2. A starting clutch according to claim 1, wherein an outer periphery of said clutch drum is devoid of an oil discharging port extending in a radial direction.

3. A starting clutch according to claim 1, wherein the starting clutch is constructed so that oil is discharged through spline grooves of said spline portion in the axial direction.

4. A starting clutch according to claim 1, wherein said contacting member is engaged with and fixed in the spline portion of the clutch drum.

5. A starting clutch according to claim 1, wherein said clutch drum is surrounded by said clutch cover.

6. A starting clutch according to claim 1, wherein a driving force from an engine is transmitted to said clutch drum through said housing.

7. A starting clutch according to claim 1, wherein a driving force from an engine is transmitted from said housing to said clutch drum through a damper device.

8. A starting clutch according to claim 1, wherein a narrow gap is provided between an open end of said clutch drum and said housing.

9. A starting clutch according to claim 1, wherein said spline portion has spline grooves with which splines of said friction plates are engaged, and wherein the starting clutch is constructed so that the oil is discharged through said spline grooves in the axial direction.

10. A starting clutch according to claim 1, wherein, a lubricating oil passage for supplying the lubricating oil is separated from a lubricating oil passage for discharging the lubricating oil.

* * * * *